US006331037B1

(12) United States Patent
Roscher et al.

(10) Patent No.: US 6,331,037 B1
(45) Date of Patent: Dec. 18, 2001

(54) DRIVE ARRANGEMENT FOR A WRITING HEAD

(75) Inventors: Dietrich Roscher, Ilmenau; Norbert Gebert, Schwansee; Udo Reinold, Geretsried, all of (DE)

(73) Assignee: ABB Instrumentation Limited, Cambridgeshire (GB)

( * ) Notice: Subject to any disclaimer, the term of this patent is extended or adjusted under 35 U.S.C. 154(b) by 0 days.

(21) Appl. No.: 09/361,911

(22) Filed: Jul. 27, 1999

(30) Foreign Application Priority Data

Jul. 27, 1998 (DE) ........................................ 198 33 782

(51) Int. Cl.[7] .............................. G01D 15/02; B41J 2/27

(52) U.S. Cl. ...................................... 346/141; 400/124.16

(58) Field of Search ............................ 346/139 R, 140.1, 346/139 C, 141; 400/124.16, 157.1, 124.11, 124.01

(56) References Cited

U.S. PATENT DOCUMENTS

| | | | | |
|---|---|---|---|---|
| 4,975,615 | | 12/1990 | Katahara | 310/328 |
| 4,976,553 | | 12/1990 | Yamaguchi | 400/124.16 |
| 5,046,872 | | 9/1991 | Chang | 400/157.1 |
| 5,165,807 | * | 11/1992 | Kanemoto | 400/124 |

FOREIGN PATENT DOCUMENTS

| | | | |
|---|---|---|---|
| 41 07 157 A1 | 3/1991 | (DE) | B41J/2/22 |
| 38 41 416 C2 | 12/1988 | (DE) | B41J/2/295 |
| 38 32 564 A1 | 9/1988 | (DE) | B41J/3/10 |
| 33 29 896 A1 | 8/1983 | (DE) | B41J/7/72 |
| 36 02 673 C2 | 4/1992 | (DE) | H02N/2/00 |
| 0 452 502 A1 | 5/1991 | (EP) | B41J/2/295 |
| B1 0 101 018 | 11/1986 | (EP) | B41J/3/10 |
| 0 488 232 A1 | 6/1992 | (EP) | H01L/41/04 |

OTHER PUBLICATIONS

Patent Abstracts of Japan, vol. 010, No. 242 (M–509) Aug. 21, 1986 and JP 61 074856 A (Nec Corp.), Apr. 17, 1986.

* cited by examiner

*Primary Examiner*—John Barlow
*Assistant Examiner*—Juanita Stephens
(74) *Attorney, Agent, or Firm*—R. Lewis Gable; Cowan, Liebowitz & Latman, PC

(57) ABSTRACT

A drive arrangement, for example for a writing head, comprising a piezoelectrically actuated lever arrangement (1*d*) for moving a writing tip (21) in the direction of a recording medium when writing on the recording medium. This drive arrangement is characterized in that a piezoelectric actuator (4) is used, which is separate from the lever arrangement (1*d*) and in that the lever arrangement (1*d*) exerts a compressive force on the piezoelectric actuator (4), which is supported against a rigid abutment (section 1*b*). This drive arrangement can be used for a series of other applications as a positioning drive. Inverse arrangements are also described.

15 Claims, 3 Drawing Sheets

DRIVE ARRANGEMENT FOR A WRITING HEAD

The invention relates to a drive arrangement, for example for a writing head, comprising a piezoelectrically actuated lever arrangement for moving a writing tip in the direction of a recording medium when writing on the recording medium. This drive arrangement can also be used in accordance with the invention as a positioning drive for a series of other applications, and can also be used in accordance with the invention as a signal generator.

The writing head which comprises at least one writing tip for writing on a recording medium can, for example, be used to apply ink to a recording medium, such as paper, with the recordings representing alphanumeric text and/or measured values. A plurality of writing tips can be used in order to print inks of different colors. However, it is not essential to use ink since recordings can also be produced thermally or by pressure on a suitably sensitive recording medium. The recordings on the recording medium can either be discontinuous, for example dots, or continuous, for example a line. The recordings can also be traces which are to be recorded for protocol or measurement purposes.

Discussion of the Prior Art

A writing head of the initially named kind is, for example, known from DE-OS-38 32 564. The movement of the writing tips against a recording medium takes place there via a lever arm which follows the movement of a piezoelectric actuator. This actuator comprises an arm which is realized in the form of a bending piezoelectric oscillator element (in the manner of a flexible tongue) which is manufactured of a sintered ceramic material. The oscillating element has a longitudinal dimension which is much greater than its cross-section so that it is elastically deformable. One end of the tongue is secured to the body of the writing head so that, when the piezoelectric oscillator element is excited by a suitable control signal, the free end of the tongue moves in the direction perpendicular to its longitudinal axis. The free end of the tongue is connected to the lever arm which can rotate up to a certain degree about an axis. On application of the control signal to the oscillating element, the end acting on the lever arm moves and swings the lever arm about its point of rotation and its forked free end drives the writing tip. This is lifted and lowered thereby in relation to a roll guiding the recording medium, with ink, which is periodically supplied from a reservoir via a feed tube to the writing tip, being applied by the latter onto the recording medium.

The construction of DE-OS 38 32 564 achieves only a small step-up via the lever arm. The expansion of the piezoelectric oscillator element is essentially itself responsible for the amplitude of the movement of the writing tip, i.e. this amplitude depends on the movement of the piezoelectric arm itself.

It is a problem with this known arrangement that a frequent and rapid to and fro movement of the piezoelectric oscillator elements, which themselves represent a part of the lever arrangement, causes fatigue which is worsened by the fact that their cross-section is very small in comparison to their length dimension. Accordingly, the piezoelectric oscillator elements break easily and frequently. This leads to a complete or partial destruction of the writing head and the printer cannot be used until the damage has been repaired. Moreover, these tongue-like piezoelectric oscillator elements are relatively expensive because they are manufactured in relatively small numbers and this makes the writing head more expensive.

The resetting of the piezoelectric tongue, which is brought about by an applied voltage, is also problematic. If the current supply is switched off, or if a fault occurs, the flexible tongue moves to a position closer to the recording medium and a situation can arise in which the writing tip contacts the recording medium and ink runs out which leads to soiling.

BRIEF SUMMARY OF THE INVENTION

The object of the present invention is to realize a favorably priced and operationally reliable drive arrangement of the initially named kind and to ensure a long working life with a mechanical resetting of the drive arrangement preferably taking place automatically. The drive arrangement should also be suitable as a positioning drive and can serve in inverse form as a signal generator.

In order to satisfy this object, a piezoelectric actuator separate from the lever arm arrangement is used, with the lever arrangement exerting a compressing force onto the piezoelectric actuator.

Expressed differently, a drive arrangement of the initially named kind is provided in accordance with the invention and is characterized in that the piezoelectric actuator is arranged in a yoke, in that the yoke exerts by spring action a compressive force onto the piezoelectric actuator and is designed as a step-up transmission, or as part of a step-up transmission, which follows at its input, on electrical energization of the piezoelectric actuator, the change of length of the actuator as an input movement and has an amplitude of motion at its output side which is a plurality of times greater.

The invention enables the use of customary piezoelectric elements for the actuator, so that the fragile and expensive tongue-like piezoelectric ceramic actuator in accordance with the prior art can be avoided. It is intended that the expression “piezoelectric actuator (or PZ actuator)” covers the use of one piezoelectric element or of a plurality of piezoelectric elements.

In the present invention the PZ actuator preferably comprises a stack of piezoelectric elements, for example in the form of discs or plates, which are stacked face-to-face along an axis which extends perpendicular to the aligned parallel faces of the elements. Because each piezoelectric element expands fractionally when a drive voltage is applied, the individual expansions of each PZ element along the axis add up, whereby a resulting movement of greater amplitude arises. This movement, which can for example amount to $5\mu$ is then further enlarged by the step-up transmission, for example by about 400 times, whereby an amplitude of movement of about 1.5 mm can be achieved on taking account of the deformations and tolerances that arise, which is straightforwardly sufficient for the actuation of the writing tip. Since the lever arrangement advantageously exerts a compressing force onto the piezoelectric actuator, for example of a stack of piezoelectric elements, a more robust and stable arrangement arises for the same degree of movement as in the arrangement known from DE-OS 38 32 564 while using customary (for example commercially available) piezoelectric elements. It is therefore more effective but less expensive and more durable than the arrangement of the prior art.

It is particularly favorable that the forces which arise through expansion of the piezoelectric elements do not act externally, i.e. are, so to say, internally taken up in the yoke or frame, if required by the step-up transmission, and thus do not act on the housing of the writing head or on the pivot axles and guides contained therein. With the compact dimensions of the writing head of the invention this is a significant advantage in comparison to the prior art, since even relatively small unbalanced forces could lead to deformations and faulty behavior of the writing head.

Moreover, the use of a force which compresses the piezoelectric elements leads in a favorable manner to a mechanically defined reset position of the actuator and thus of the writing tip.

The PZ actuator (for example a stack of PZ elements) is preferably compressed between a movable part of the lever arm and a fixed part of the arrangement. It can for example be mounted between a section of a lever arm and a carrier secured to the writing head. It is preferably compressed in a U-shaped yoke or closed frame which expands when the Pz actuator is excited. With one embodiment of the invention a U-shaped or C-shaped yoke which has a unitary flexible section (which acts as a hinge or joint) engages around the PZ actuator element so that the yoke expands fractionally when the PZ element or the PZ elements is or are excited. The yoke returns to its starting position when the excitation ceases. The PZ actuator can be secured in the yoke by a releasable means for setting the compressing force, for example by a wedge.

In order to increase the movement of the PZ actuator the yoke can have a limb which is resiliently hinged via the flexible section to the rigid remainder of the yoke and which acts as a lever arrangement. This lever arrangement is designed in order to produce a mechanical step-up ratio, so that the movement applied by the PZ actuator (for example to an input section of a lever arm) produces a significantly greater movement at its output section. This can be easily and advantageously achieved with embodiments of the invention.

As brought out above, the limb is hingedly connected to the remainder of the yoke via the flexible section, so that the flexible section forms a pivot axis. When the distance between the point of action of the piezoelectric actuator at the said limb and the pivot axis is smaller than the distance between the free end of the limb and the pivot axis, a mechanical enlargement of the movement of the piezoelectric actuator arises at the free end of the limb. In other words, in a first preferred embodiment of the invention a U- or C-shaped frame carries the piezoelectric actuator and a movable limb of the yoke moves pivotally in relationship to the remainder of the yoke. The lever action preferably takes place in such a way that the movements of the PZ actuator or of the PZ elements is enlarged by the movable limb of the frame. This lever arrangement thus forms a first stage of a multi-stage step-up transmission. Other step-up stages can, however, also be used, additionally or in place of this, in order to enlarge the movement of the PZ actuator, or of the PZ elements, and thus to provide the required amplitude of movement of the writing tip.

A drive arrangement is particularly preferred in which the step-up transmission or the second stage of the step-up transmission is realized as a differential sliding transmission. This arrangement is in particular characterized in that the differential sliding transmission comprises two elongate members, with the first member being actuated at its one end by the said limb of the yoke, the second member being held at its one end by a further part of the yoke and the two members being secured to one another at their other ends. With such a differential sliding transmission very large step-up ratios can be realized depending on the length ratios of the two members which are preferably formed as leaf springs, however, with restricted total amplitude which is, however, completely sufficient for a writing head of the initially named kind.

In this variant of the first embodiment of the invention elastic components or strips, i.e. the members realized as leaf springs, are used in order to transmit the movement of the movable limb to a remote point where the transmitted movement is used either directly or indirectly. The free ends of the elastic components or strips are secured to one another at the remote point. Through the attachment of the other ends of the strip at the yoke, i.e. at the movable limb and at a rigid part of the yoke, a differential movement of the strips occurs on movement of the movable limb and is converted into a movement of the remote ends, the amplitude of which amounts to a multiple of the amplitude of movement of the free end of the movable limb.

In general it should be noted that when a stack of PZ elements is used, these can be suitably held by a carrier. An adjustment means can be provided on the carrier in order to set the compression forces exerted onto the PZ elements. A wedge can, for example, be inserted between the PZ elements and one side of the carrier in order to secure them and/or to provide a preload. Alternatively, a screw engaged in the carrier can be tightened in order to secure and/or preload a stack of PZ elements.

BRIEF DESCRIPTION OF THE SEVERAL VIEWS OF THE DRAWINGS

The invention will be described in more detail in the following by way of example only and with reference to the drawings in which are shown.

DETAILED DESCRIPTION

Figure 1:
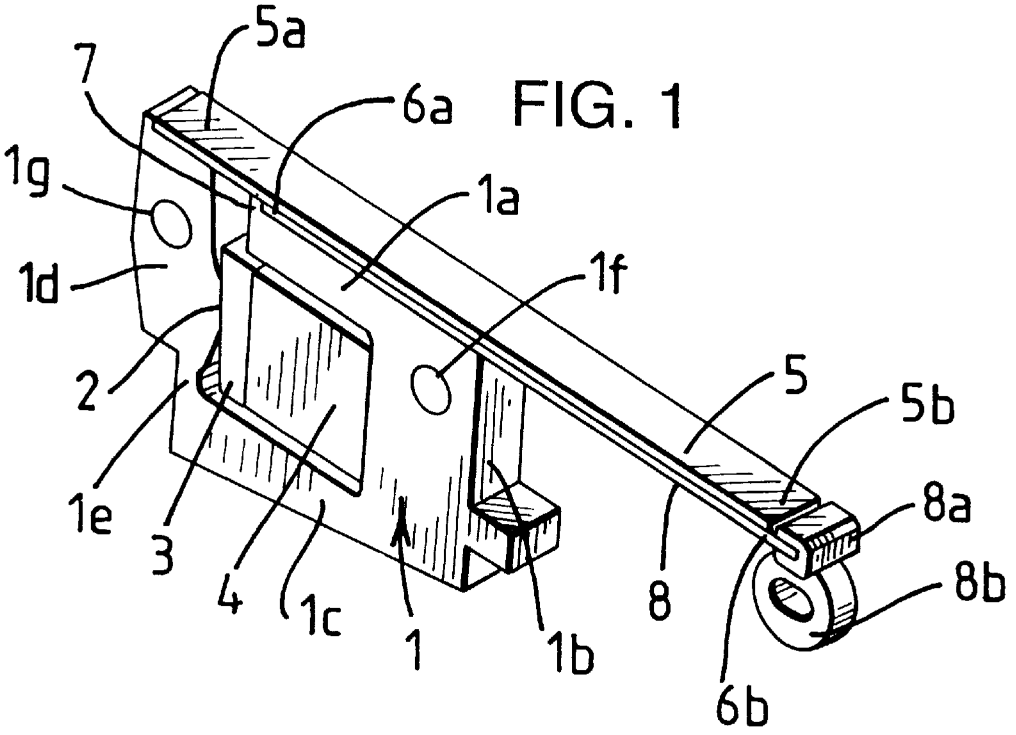
FIG. 1 a perspective view of a drive arrangement which is used in a preferred embodiment of the invention, FIG. 2 a perspective view of the drive arrangement of FIG. 1 which is incorporated into a writing head subassembly.

FIG. 1 shows a drive arrangement for a writing head in accordance with a preferred embodiment of the invention. A generally C-shaped yoke 1 has rigid sections 1*a*, 1*b* and 1*c* (which are normally stationary) and a movable limb 1*d* which is connected to the lower stationary section 1*c* by a flexible portion 1*e* with thin cross-section. The flexible section 1*e* acts as a one-piece hinge, whereby the limb 1*d* can move pivotally (about the joint 1*e*) in relation to the fixed lower section 1*c*. The movable limb 1*d* has a projection or cam 2 which is shown in contact with a wedge 3. A stack of piezoelectric elements 4 is held in the frame and secured and preloaded by the wedge 3, which is forced between one side of the PZ stack 4 and the projection and/or cam 2. The internal stress of the prestressed yoke exerts a compressing force onto the stack of the piezoelectric elements 4. When the stack of piezoelectric elements 4 is excited, these expand and exert a combined force between the fixed side section 1*b* of the frame and the wedge 3. This exerts a force on the cam 2 which causes the movable limb 1*d* to pivot about the joint, i.e. while increasing the spring tension of the yoke. When the excitation of the PZ elements is reduced or ceases, they contract and the movable limb 1*d* returns as a result of the elasticity of the flexible section 1*e* into a starting position. When a pulsating signal is used to excite the PZ stack 4, the movable limb 1*d* of the yoke 1 will accordingly oscillate or swing about the joint 1*e*. The oscillating or swinging movement is enlarged by the lever action of the limb 1*d* and is transmitted in stepped-up form to the writing tip as explained below. The limb 1*d* forms a first step-up stage of a step-up transmission, which in this case has three stages.

The yoke 1 carries two flexible strips or leaf springs 5, 6 which can, for example, be manufactured of spring steel and form a differential sliding transmission. The upper strip 5 is secured at one end 5*a* to the upper part of the movable arm 1*d*. It is attached at its other end 5*b* to the free end 6*b* of the lower strip 6 (the attached ends 5*b*, 6*b* swing in a vertical direction as is described below). The other end 6*a* of the strip 6 is arranged on a shoulder section 7 at the upper part of the fixed frame section 1*a* and can be secured to the section 1*a* of the yoke. This shoulder 7 acts as an abutment in order to prevent the end 6*a* of the strip being moved during movement of the limb 1*d*.

When a pulsating signal is applied to the piezoelectric elements 4, the movable limb 1*d* oscillates which causes the upper strip 5 to move backwardly and then forwardly in the horizontal direction (i.e. parallel to its longitudinal axis). The far end 5*b* of the strip is connected to the far end 6*b* of the lower strip 6, however, the near end 6*a* of the strip 6 lies firmly against the shoulder 7, i.e. on the section 1*a*, and the result is a pulling, sliding and bending action of the strips 5 and 6 which causes the connected ends 5*b* and 6*b* to first move upwardly in the vertical direction and then downwardly. With a design of approximately the ratios shown in FIGS. 1 and 2 a translation of about 20:1 can be straightforwardly achieved by the differential sliding transmission and can be straightforwardly increased by extending the leaf springs 5 and 6. This signifies that a pivotal movement of the limb 1*d* about the hinge 1*e* leads to a horizontal movement of the free end of the limbs 1*d* with an amplitude A in FIG. 1 and via the differential sliding transmission to a vertical movement of the connected together ends 5*b* and 6*b* of the differential sliding transmission with an amplitude of 20 A. The differential sliding transmission thus forms a second stage, the input of which (the end 5*a* of the leaf spring 5) is coupled to the output (the free end of the limb 1*d*) of the first step-up stage.

Figure 2:
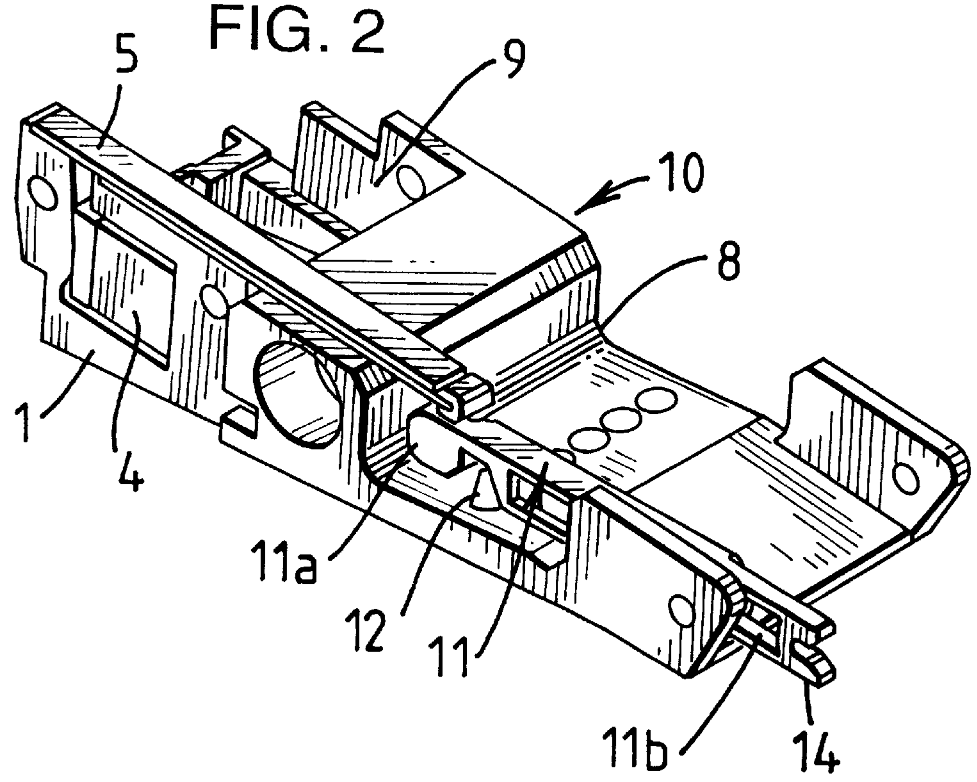

The vertical movement or oscillation of the secured together ends 5*b*, 6*b*, i.e. the output of the second step-up stage formed by the differential sliding transmission, is transmitted via a coupling 8 (which comprises a forked section 8*a* and an eye section 8*b*) to a further lever arrangement 11 as is shown in FIG. 2.

FIG. 2 shows a subassembly 10 of a writing head (which is not shown in all details) which includes a carrier section 9 in which a plurality of yokes 1 can be accommodated of which only one is shown in FIG. 2. The lever arrangement 11 comprises a shorter arm 11*a* and a longer arm 11*b* on respective sides of a rotary spigot (or of a rotary axle) 12. This enlarges the oscillating movement of the ends 5*b*, 6*b* of the strips 5, 6 which results in the remote end 14 of the longer arm section 11*b* oscillating over a greater distance in the vertical direction. This further lever arrangement 11 forms a third step-up stage, here with a step-up ratio of 8:1. The output end of the differential sliding transmission, i.e. the secured together ends 5*b*, 6*b* of the leaf springs 5 and 6, are thus connected to the input end of the third step-up stage in the form of the lever 11. The forked end 14 of the lever 11 directly drives a writing tip 16, for example in the same manner as is described in the initially named document DE-OS 38 32 564.

In a practical embodiment of the arrangement shown in FIGS. 1 and 2, the stack of PZ elements was preloaded to about 10 to 50% of its pressure force.

If one assumes a step-up ratio of 2.5:1 for the first step-up stage in the form of the limb 1*d*, a step-up ratio of 20:1 for the second step-up stage in the form of the differential sliding transmission 5, 6 and a step-up ratio of 8:1 for the third step-up stage, then a total step-up of the three-stage step-up transmission of 2.5×20×8:1=400:1 results, whereby, from the stack of five piezoelements with an expansion of a total of 5μ, a movement can be expected at the output end of the third step-up stage, i.e. at the writing tip of 400×5μ=2 mm.

The arrangement shown in FIG. 1 has various advantages when compared to the arrangement disclosed in DE-OS 38 32 564. By way of example, the yoke 1 reliably holds the stack of PZ elements 4. The PZ elements 4 can consist of a type which is easily commercially available and which is far less fragile and expensive than the type of PZ actuator used in DE-OS 38 32 564. The yoke 1 has a simple but solid construction and the PZ elements can easily be secured in the frame or removed by simply removing the wedge 3 and resetting it. This facilitates servicing, apart from the fact that it is more robust. The frame 1 has its own one-piece flexible hinge 1*e* which avoids the need for separate springs. The movable limb 1*d* of the frame 1 has a simple shape (with the projection or cam 2) but produces a first degree of multiplication of the movement of the PZ elements 4. A second multiplication stage is provided by the elastic strips 5, 6. These can be manufactured simply of spring steel and are thus solid, reliable and less expensive (than the ceramic PZ actuator of DE-OS 38 32 564). The drive arrangement of FIG. 1 can also be easily received in a carrier 9 of simple construction, which simplifies servicing.

No notable forces which act within the yoke act towards the outside. Only the forces which are required to actuate the writing tip have to be carried by the housing or by parts outside of the actuator.

Figure 3:
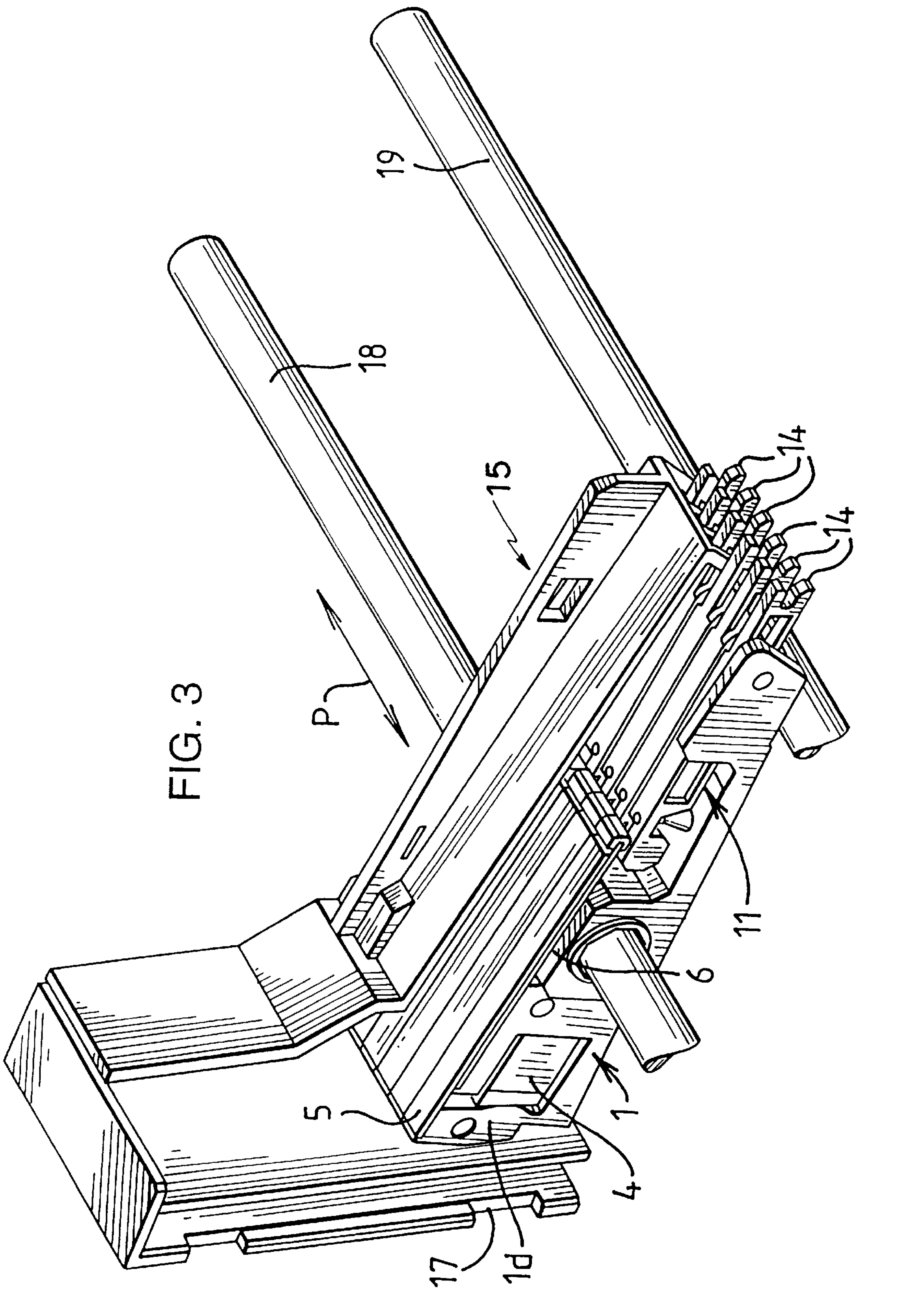
FIG. 3 a schematic perspective representation of the writing head of FIG. 2 to an enlarged scale, and FIG. 4 a side view of the writing head of FIG. 3 with a writing tip and a guide roll for a recording medium.

As is shown in FIG. 3, the carrier 9 can carry further, for example five further drive arrangements 1 side by side in order to drive a writing tip arrangement in the w The writing head 15 carries at its lefthand end in FIG. 3 a circuit board 17 which makes available the control voltages for the piezoelectric elements 4. The writing head is movable along the guide shaft 18 in the direction of the double arrow P. The angular alignment of the writing head 15 is ensured by a further guide shaft 19 which is surrounded at least partly by a part 20 as shown in FIG. 4.

Figure 4:
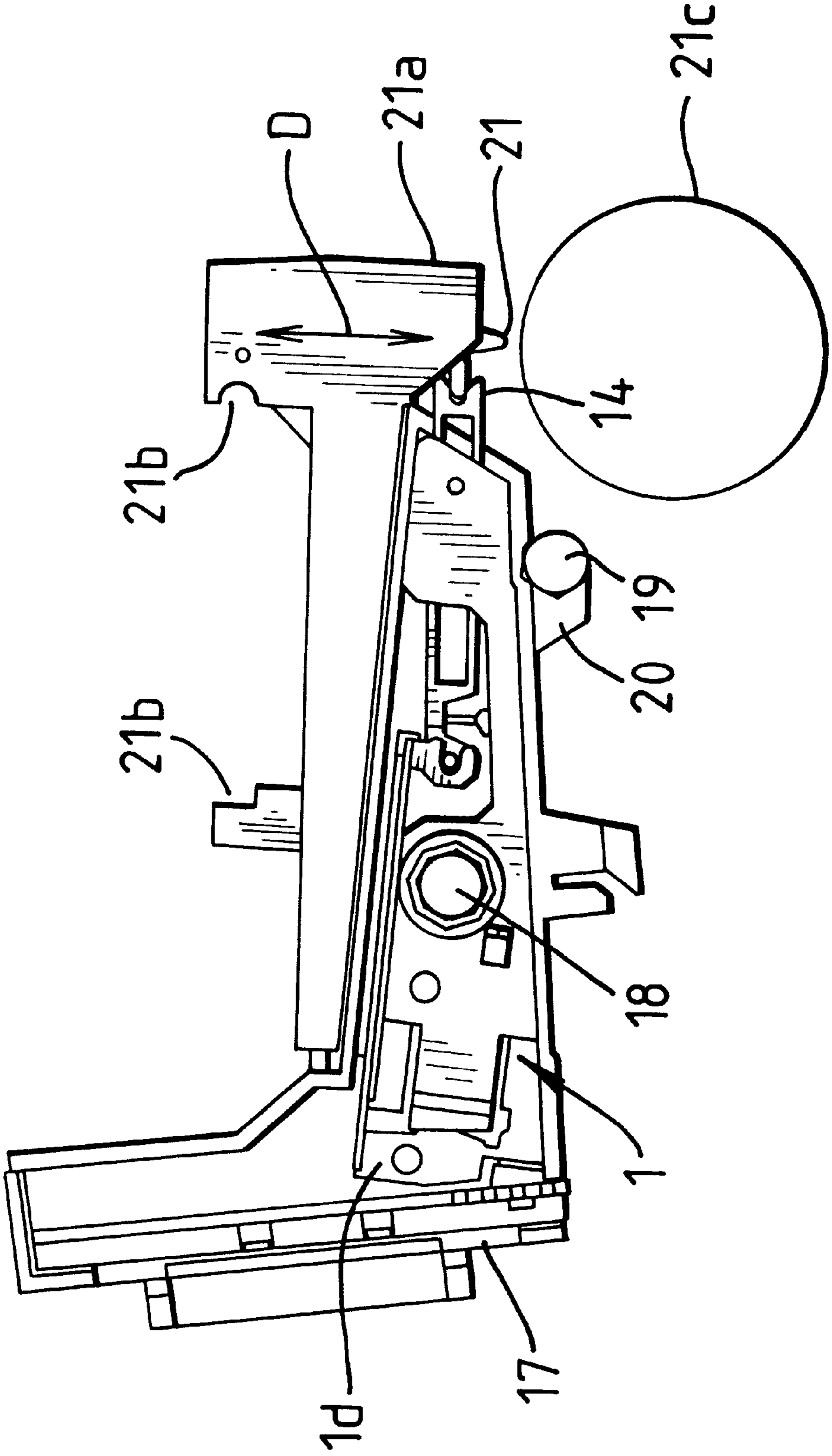

FIG. 4 shows moreover how the forked end 14 of the lever 11 moves the writing tip 21 in the direction of the double arrow D, with the writing tip being guided in the perpendicular direction in the head 21*a* and communicating with an ink cartridge, which is not shown, but which is insertable into the mount 21*b* (one cartridge per writing tip 21). The roll 21*c* which carries the recording medium can likewise be seen in FIG. 4.

The writing tip 21 is moved in the direction towards the roll 21*c* by the actuation of the piezoelectric actuator and is reset by the spring tension of the limb 1*d*.

The above description is concerned with the use of the drive arrangement of the invention for a writing head. This arrangement can, however, also be used as a general positioning drive for the most diverse tasks. For example it can be used as a switch, in order to switch over optical fibers for communication channels. In such an arrangement the one end of an optical fiber which is mounted to the output end of the differential sliding transmission can, for example, be brought, depending on the switch position, into alignment with the two further optical fiber ends to realize a branch function.

The drive arrangement can also be used as a positioning drive for the deflection of a mirror, for example in an optical instrument. It will also be entirely conceivable to mount an optical component, for example a laser diode, at the output side of the step-up transmission and to realize an optical scanning function by corresponding movement of the step-up transmission.

Finally, the drive arrangement can be used in inverse form as a signal generator. In such an arrangement, the previous output side of the step-up transmission is used as the input side of a step-down transmission and the piezoelectric part previously used as an actuator then serves for the signal generation. By way of example, the end of the differential sliding transmission at which the two elongate members are secured together can be used to detect a movement—one can imagine for example the movement of a tool to the end of its working path—with the electrical output signal of the piezo-electric part rising in proportion to the movement.

Best Mode

The best mode of realizing the invention known to the inventors is that shown and described with reference to the accompanying drawings, but with the modification that instead of using the wedge a spacer member is used in the following manner: To achieve the pre-compression of the piezoelements, the frame I is first spread elastically apart by pulling in opposite directions on the limb 1*b* and the limb 1*d* using a tool which engages in the apertures 1*f* and 1*g* (see FIG. 1).

The piezoelements and the spacer member are then inserted and held in place by an epoxy resin adhesive. Thereafter, the tool is removed so that the frame 1 tries to relax, and in doing so the limb 1*d* moves towards the limb 1*b*, thus introducing the requisite compressive strain in the piezoelectric elements. The strips 5 and 6, which are formed in one piece with the limbs 1*d* and 1*a*, with the strip 6 being connected to the limb 1*a* at the position of the shoulder 7 (which can be omitted), are then welded together at their far ends 5*b* and 6*b*.

What is claimed is:

1. Drive arrangement comprising:

a frame including first, second and third rigid sections which are rigidly connected together to form a stationery yoke, wherein said first and third sections form opposite sides of the yoke and are connected by said second section, said frame being open opposite said second section;

a movable limb resiliently hinged to said third section and extending freely across the open part of said frame opposite said second section, said movable limb extending from said third section to said first section;

a piezoelectric actuator compressively located between said movable limb and said second side sections, whereby said movable limb can be resiliently displaced when said piezoelectric actuator is energized by a pulsating signal, which causes said actuator to expand and contract, and wherein only said movable limb applies the compressive force for locating said piezo-electric actuator;

a step-up transmission including first and second elongate, resiliently flexible elements each having first and second ends; said first ends of first and second elongate, resiliently flexible elements being fixed respectively to said first and third sections of said yoke; said second ends of said first and second elongate, resiliently flexible elements being connected together, said first and second flexible elements providing a differential sliding transmission for stepping up said resilient displacement of said first section, by said piezoelectric actuator, whereby displacement of said connected second ends of said first and second elongate, resiliently flexible elements is increased; and said first and second elements extending in parallel directions adjacent to the first section of the yoke.

2. Drive arrangement according to claim 1, wherein the movable limb forms a first step-up stage and said step-up transmission forms a second step-up stage.

3. Drive arrangement according to claim 2, wherein the piezoelectric actuator acts on said movable limb at a point which is nearer to the hinge connection than to the end portion of said movable limb which is fixed to the end of said first element.

4. Drive arrangement according to claim 2, wherein said movable limb is resiliently hinged to the said third section of the yoke by a resilient portion of said yoke.

5. Drive arrangement according to claim 1, wherein at least said second element is formed as a leaf spring.

6. Drive arrangement according to claim 1, wherein both said second element and said first element are formed as leaf springs.

7. Drive arrangement according to claim 1, wherein said frame is a substantially U-shaped yoke.

8. Drive arrangement in accordance with claim 1, wherein said sliding transmission is coupled at an output end to a further step-up stage.

9. Drive arrangement in accordance with claim 1, wherein said step-up transmission has a step-up ratio greater than 5.

10. Drive arrangement in accordance with claim 1, wherein said step-up transmission has a step-ratio within a range of from 10 to 1000.

11. Drive arrangement in accordance with claim 1, wherein said piezoelectric actuator is located so as to produce a step-up ratio of about 2.5:1 and said step-up transmission produces a step-up ratio of about 20:1 and a further stage of step-up transmission produces a step-up ratio of about 8:1.

12. Drive arrangement in accordance with claim 1, wherein said piezoelectric actuator comprises a plurality of piezoelectric elements, formed as discs or plates stacked face to face along an axis extending perpendicular to each parallel face of said piezoelectric elements.

13. Drive arrangement in accordance with claim 1, further including an adjustment member to set compression forces exerted on said piezoelectric actuator.

14. Drive arrangement in accordance with claim 1, wherein said first and second elongate, resiliently flexible elements extend substantially parallel to a line of action of the piezoelectric actuator when caused to expand and contract.

15. Printing head, having at least one printing device for printing on a recording medium, a carrier for holding the recording medium, and one or more drive arrangements for driving said printing device, each said drive arrangement comprising:

a frame including first, second and third rigid sections which are rigidly connected together to form a stationery yoke, wherein said first and third sections form opposite sides of the yoke and are connected by said second section, said frame being open opposite said second section;

a movable limb resiliently hinged to said third section and extending freely across the open part of said frame opposite said second section, said movable limb extending from said third section to said first section;

a piezoelectric actuator compressively located between said movable limb and second sections, whereby said movable limb can be resiliently displaced when said piezoelectric actuator is energized by a pulsating signal, which causes said actuator to expand and contract, and wherein only said movable limb applies the compressive force for locating said piezoelectric actuator;

a step-up transmission including first and second elongate, resiliently flexible elements each having first and second ends; said first ends of first and second elongate, resiliently flexible elements being fixed respectively to said first and third sections of said yoke; said second ends of said first and second elongate, resiliently flexible elements being connected together, said first and second flexible elements providing a differential sliding transmission for stepping up said resilient displacement of said first section, by said piezoelectric actuator, whereby displacement of said connected second ends of said first and second elongate, resiliently flexible elements is increased; and said first and second elements extending in parallel directions adjacent to the first section of the yoke, said second ends of said first and second elongate, resiliently flexible elements, which are connected together, being coupled to said printing device.

* * * * *